Jan. 29, 1924.  1,481,933
G. STOWE ET AL
SPEED CONTROLLING BRAKE FOR VEHICLES
Original Filed Jan. 29, 1919
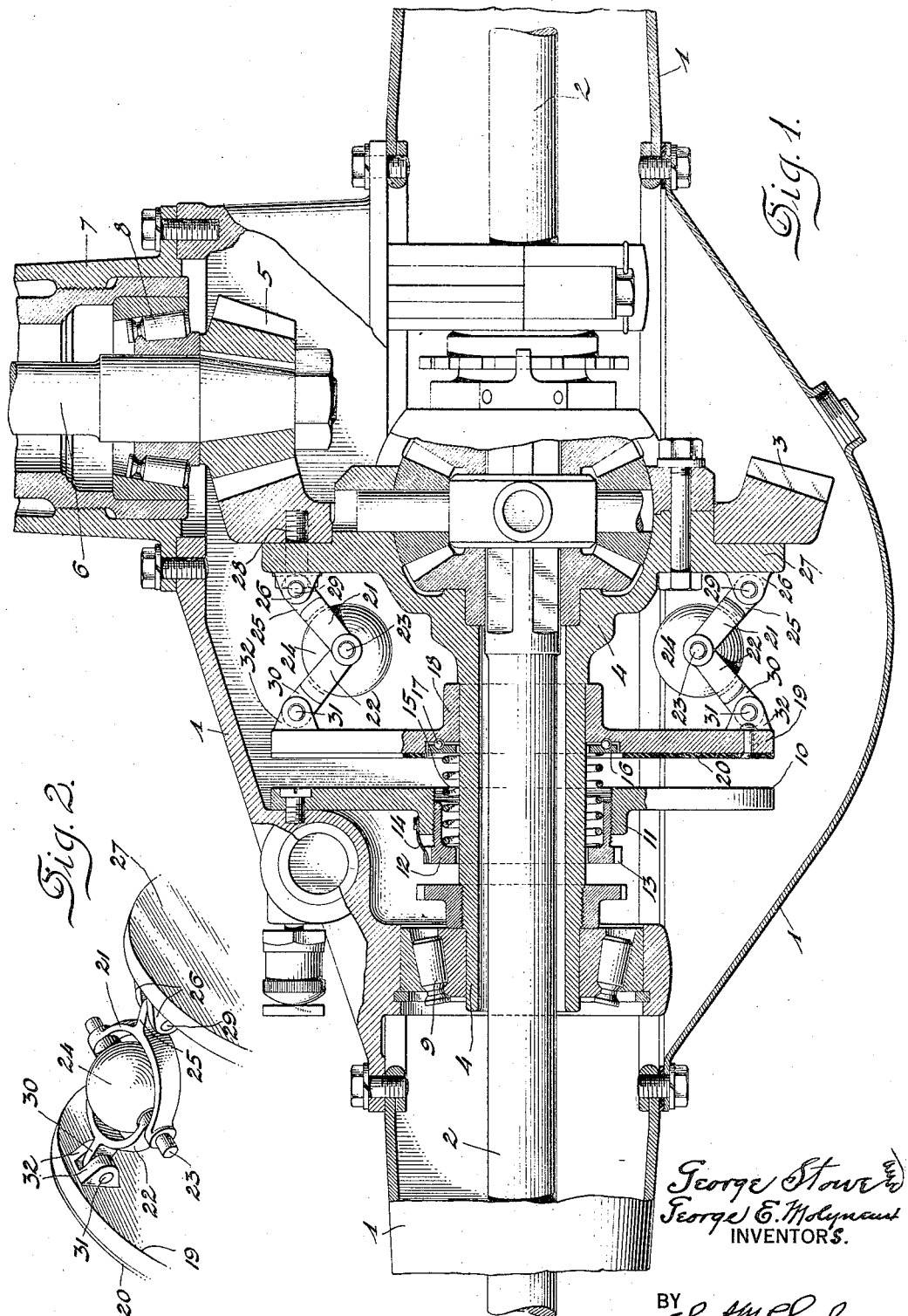
George Stowe
George E. Molyneux
INVENTORS.
BY Chas. M. Chapman,
ATTORNEY.

Patented Jan. 29, 1924.

1,481,933

UNITED STATES PATENT OFFICE.

GEORGE STOWE, OF NEW YORK, N. Y., AND GEORGE E. MOLYNEUX, OF BAYONNE, NEW JERSEY, ASSIGNORS OF ONE-THIRD TO JOHN F. ALVORD, OF NEW YORK, N. Y.

SPEED-CONTROLLING BRAKE FOR VEHICLES.

Application filed January 29, 1919, Serial No. 273,716. Renewed February 2, 1923.

*To all whom it may concern:*

Be it known that we, GEORGE STOWE and GEORGE E. MOLYNEUX, both citizens of the United States, residing, respectively, in the borough of Manhattan, city, county, and State of New York, and Bayonne, county of Hudson, and State of New Jersey, have invented certain new and useful Improvements in Speed-Controlling Brakes for Vehicles, of which the following is a specification.

This invention has reference to brake mechanisms for automobiles and similar vehicles, and, particularly, has reference to automatically operating brakes controlled by the speed of the vehicle.

Among the objects of our invention may be noted the following: to provide a brake mechanism which will go into action automatically when the speed of the vehicle exceeds a predetermined maximum, thus imposing a braking action upon the driven axle to check and prevent excess speed of the latter; to provide an automatically operating brake adapted to be applied and released, according to predetermination, during a given speed of the vehicle; to provide a brake controlling mechanism adapted to operate through the medium of the speed of the driving shaft or source of power, and to automatically apply the brake to the driven member, to prevent the latter from exceeding a predetermined speed; to provide a controlling mechanism, for automatically operating brakes, adapted to be adjusted so as to cause the brake to be applied during the operation of the vehicle when variable predetermined speeds of the driven shaft or member are exceeded; to provide an automatically-acting, brake-applying and brake-releasing mechanism adapted to go into action, according to predetermination, when a certain speed of the vehicle has been exceeded, so as to prevent excess of said speed and reduce the latter, and then automatically release or go out of action, so as to enable the vehicle to continue at proper speed; to provide a brake controlling mechanism operated by centrifugal force and adapted to automatically go into and out of action during the drive of the motive power and the running of the vehicle, without actually stopping the latter; and to provide certain details of construction which are strong, durable, economical and effective for accomplishing the purposes set forth in the foregoing.

With the above objects in view and others which will be detailed during the course of this description, our invention consists in the parts, features, elements and combinations thereof hereinafter described and claimed.

In order that our invention may be clearly understood, we have provided drawings wherein:

Figure 1 is a sectional plan of a driving and brake mechanism of a power driven vehicle, such, for example, as an automobile, embodying our invention; and Figure 2 is a perspective view of the governor or controller member forming part of the brake mechanism.

Primarily, it should be noted that automobiles, frequently driven at dangerous speed, are provided with no means, excepting manually operated brakes or devices, for controlling the speed, cutting down the latter, or applying the brakes; and that, in coasting, an automobile frequently attains a dangerously high speed which leads to accidents which cannot be readily avoided, due to lack of presence of mind of the driver. Our invention is provided with a view to controlling the maximum speed at which a vehicle can run, either under power or while coasting, thus preventing high or dangerous speeds being attained at any time and placing a check not only upon the tendency of a car, when coasting, to speed up; but, also upon reckless driving.

Referring to the drawings, the numeral 1 indicates the differential or rear axle casing of an automobile, and the latter may be of any usual type. 2 is the rear axle which, as usual, is in two parts joined by the usual clutch and differential gearing and driven in the usual way by gearing 3 secured to the sleeve 4, the enlarged end of which encases the differential gear. The gear 3 is driven by the gear 5 secured, as usual, to the driving shaft 6 which may extend to a source of power, or have the latter connected directly thereto. 7 is the casing of the driving shaft, 8 is the usual anti-frictional bearing, and a similar bearing is provided at 9 for the sleeve 4 through which the rear axle or shaft extends.

Our automatic brake, and automatic controlling mechanism therefor, consist of the fixed brake disk 10 secured to the casing 1 in any strong and durable manner, having a hub 11 which is internally screw-threaded to receive an externally screw-threaded spring-receiving cup 12, the periphery of which is notched, as at 13, to receive a spring detent 14 to hold any position of adjustment to which the cup may be set. The function of the cup is to hold the spring 15, one end of which is seated therein, with the proper amount of tension against the bearing plate 16, which bears anti-frictionally, as through the medium of the series of balls 17, against the hub 18 of the complemental brake member 19, which is adapted to rotate with the sleeve 4 and to slide upon said sleeve toward and from the brake member 10. The face of the shiftable brake member 19 is provided with a brake-pad or frictional member 20 of any suitable material, enabling it to impose the requisite amount of friction upon the brake member 10. The normal position of the brake member 19 is maintained by the spring 15; and the latter may be adjusted as to predetermined amount of centrifugal force required to enable the brake member 19 to engage the brake member 10. When the speed of the vehicle, or the drive of the motive power, has produced a certain number of revolutions per minute of the rear axle, the disk 19 may be forced to approach the disk 10 and engage the latter against opposition of spring 15; and, instantly the speed of the vehicle is reduced, enabling the disk 19 to be released from the disk 10, the spring 15 will operate upon the shiftable disk 19 to cause a rapid separation of the two brake disks, thus avoiding unnecessary drag and so-called freezing together of the brake disks. The anti-frictional ring 16 and the ball bearings 17 are interposed to prevent the spring from being affected by the rotation of the disk 19.

The controlling mechanism for the brake consists of a plurality of centrifugally operated devices, each consisting of a pair of semi-circular levers 21, 22, the latter being slightly smaller in diameter than the former and the two being joined together by a pin 23, which passes through apertures in the ends of the arms, and which also supports, within the confines of the two levers, a ball weight 24. The lever 21 has an extension 25 pivoted between two ears 26 on the flat member 27 of the sleeve 4, to which member the gear 3 is rigidly secured, as by a plurality of bolts 28. The pivotal pin 29 passing through the ears 26 and extension 25, permits the lever 21 to swing freely in an angular direction transversely to the sleeve 4, and circularly relatively to the flat member 27. The lever 22 has the extension 30 supported by the pin 31 passing therethrough and through the ears 32, secured to the brake disk 19, said lever 22 being capable of swinging in the same manner as the lever 21. The weight 24 is predetermined to resist the revolution of the sleeve 4, up to a certain number of revolutions per minute, indicative of a predetermined speed of the vehicle which it is desired shall not be exceeded. When said speed is exceeded, the balls or weights will fly outwardly, under centrifugal force, thus causing the brake member 19 to be shifted automatically into engagement with the fixed brake member 10, the controlling weights throwing the levers outwardly and giving a toggle action to drive the member 19 toward the member 10. The distance between the brake members 10 and 19 normally is gaged with reference to the extent of movement of the levers 21 and 22, to prevent the latter from reaching a dead center indicated by a plane cutting the axis of the weight 24 and the axes of the levers 21 and 22. The weights will operate between the aforesaid plane and the sleeve 4, so that centrifugal force will simultaneously drive all the weight uniformly outwardly, thus shifting the brake member 19 uniformly toward the brake member 10. The weights are interchangeable for others lighter or heavier, according to the maximum speed of vehicle desired; and the adjustment of the tension of spring 15 can be regulated for a given weight of balls 24 to make the work of the latter harder or easier, with reference to the speed of the vehicle, in automatically applying the brake.

From the foregoing it will be seen that, under ordinary conditions, the controlling mechanism, viz., the levers 21 and 22 and the weights 24 will assume the position shown in Figure 1, as the result of pressure imposed by the spring 15 upon the disk 19, and that the latter will be thus held during any speed of the vehicle or rear axle thereof below the maximum speed which it is desired the vehicle shall not exceed. When the vehicle, or the rear axle thereof, tends to exceed the said maximum speed, centrifugal force will drive the weights 24 outwardly, resulting in overcoming the force of the spring 15, and thus driving the disk 19 toward the disk 10 to automatically reduce the speed of the vehicle. This action will continue as long as the predetermined maximum speed of the vehicle or axle is exceeded, and, if the power driving the shaft 6 be sufficiently great, the disk 19 will be driven against the disk 10 and held there with considerable force, thus imposing a strong, continuous, automatic braking action upon the rear axle, and causing the clutch to slip and bringing the vehicle down to the maximum predetermined speed. When the latter is reached, the brake member 19 will tend to separate from the member 10 and the action of the spring 15 will be sufficient to cause the quick separation, thus preventing continuous drag of one of the brake members upon the other, and overcoming any tendency of the two to freeze together.

Having thus described our invention, what we claim and desire to secure by Letters Patent is:

1. A motor vehicle having means for normally driving the same at any or at indefinite speed; a normally unset brake mechanism for controlling the speed of the vehicle regardless of the speed of the driving means; and automatic means operating upon the brake mechanism to cause the latter to go into action, when the speed of the vehicle exceeds a predetermined maximum, and operate to reduce the speed of the vehicle.

2. A motor vehicle having means for driving the same at any or at indefinite speed; in combination with a normally unset brake mechanism, for controlling the speed of the vehicle regardless of the speed of the driving means, including means which automatically operates upon its brake members, when the speed of the vehicle exceeds a predetermined maximum, to reduce the speed of the vehicle.

3. A motor vehicle having means for driving the same at any or at indefinite speed; a normally unset brake mechanism, for controlling the speed of the vehicle regardless of the speed of the motor, including means to reduce the speed of the vehicle to a predetermined rate when that rate is exceeded due to the driving means.

4. A motor vehicle having means for driving the same at any or at indefinite speed; a normally unset brake mechanism adapted to control the speed of the vehicle above a predetermined maximum regardless of the speed of the motor; and means for actuating the brake mechanism, when the said maximum speed of the vehicle is exceeded, to reduce the speed of the vehicle to said maximum speed and then automatically go out of action.

5. A motor vehicle having means for driving the same at any or at indefinite speed; a normally unset brake mechanism adapted to reduce and control the speed of the vehicle above a predetermined maximum regardless of the speed of the motor, said brake mechanism including a driven member mounted for rotation and right-line reciprocation; means for applying friction to said driven member; means for rotating and reciprocating said driven member; and means for controlling the time of application of friction by the speed of the vehicle.

6. A motor vehicle having means for driving the same at any or at indefinite speed; a normally unset brake mechanism adapted to reduce and control the speed of the vehicle above a predetermined maximum regardless of the speed of the motor, said brake mechanism including a rotating and reciprocating member; and means for applying friction to said member controlled by centrifugal force.

7. A motor vehicle having means for driving the same at any or at indefinite speed; a brake mechanism comprising a fixed member having a hub; a spring housed within the hub; means for adjusting the tension of said spring; a movable brake member normally under the influence of the said spring to hold the same apart from the fixed member; and means for driving the movable member against the fixed member in opposition to the tension of the spring when the speed of the vehicle exceeds a predetermined maximum.

8. A motor vehicle having means for driving the same at any or at indefinite speed; a brake mechanism comprising a fixed member having a hub; a spring housed within the hub; means for adjusting the tension of said spring; a movable brake member normally under the influence of the said spring to hold the same apart from the fixed member; and means, for driving the movable member against the fixed member when the speed of the vehicle exceeds a predetermined maximum in opposition to the tension of the spring, comprising a plurality of devices operable by centrifugal force.

9. A motor vehicle having means for driving the same at any or at indefinite speed; a brake mechanism comprising a fixed brake member and a movable brake member connected to the part to be subjected to the braking action; means for holding said members apart under predetermined pressure; and means for automatically shifting the movable member into engagement with the fixed member in opposition to the pressure means when the speed of the vehicle exceeds a predetermined maximum.

10. A motor vehicle having means for driving the same at any or at indefinite speed; a brake mechanism comprising a fixed member, and a movable member adapted to be rotated and reciprocated; means for rotating the movable member consonantly with the speed of the vehicle; means for normally holding the movable member apart from the fixed member; and means for driving the movable member in a right-line against the fixed member when the speed of the vehicle exceeds a predetermined maximum.

11. In combination with a power driven traction vehicle, a brake mechanism arranged in the axle casing adjacent the differential gear; and means within the axle casing for operating the brake mechanism and controlling the speed of the vehicle.

12. In combination with a power driven traction vehicle, a brake mechanism arranged in the axle casing adjacent the differential gear; and means within the axle casing under control of the speed of the vehicle for operating the brake mechanism and controlling the speed of the vehicle.

13. In combination with the differential gearing of a power-driven vehicle, a casing enclosing the same; brake mechanism located in said casing; operating mechanism in said casing; and means controlled by the speed of the gearing for applying the brake.

14. In combination with the driving shaft of a vehicle, a driven shaft; differential driving gearing between the driven and driving shafts; brake mechanism a part of which is connected to the gearing so as to control the driven shaft; and means for actuating and controlling the action of the brake mechanism through the medium of the speed of the driven shaft.

15. In combination with the driven shaft of a vehicle, clutch mechanism controlling said shaft; a driving shaft; driving gear between the two shafts; brake mechanism connected to the gear; and means whereby the brake mechanism may be controlled by the speed of the vehicle or driven shaft to reduce the speed of the driven shaft and overcome the control of the clutch.

16. In combination with the driving shaft of a vehicle, a driven shaft; gearing between the two shafts; a stationary brake member; a movable brake member connected to the gearing; and means controlled by the speed of the driving shaft for shifting the movable brake member into engagement with the stationary member to reduce the speed of the vehicle.

17. In combination with the driving shaft of a vehicle, a driven shaft; gearing between the two shafts; a stationary brake member; a movable brake member connected to the gearing; and means controlled by centrifugal force for shifting the movable brake member into engagement with the stationary member to reduce the speed of the vehicle.

18. In combination with the driving shaft of a vehicle, a driven shaft; gearing between the two shafts; a stationary brake member; a movable brake member connected to the gearing; and toggle mechanism for shifting the movable brake member into engagement with the stationary member.

19. In combination with the driving shaft of a vehicle, a driven shaft; gearing between the two shafts; a stationary brake member; a movable brake member connected to the gearing; and toggle mechanism weighted at its joint for shifting the movable brake member into engagement with the stationary member.

20. In combination with the driving and driven shafts of a vehicle, gearing between the two shafts; a casing enclosing the gearing and driven shaft; a fixed brake member mounted in the casing; a movable brake member mounted in cooperative relation to the other brake member and normally out of engagement therewith; and means controlled by the speed of the driving shaft for shifting the movable member into engagement with the fixed member.

21. In combination with the driving and driven shafts of a vehicle, gearing between the two shafts; a casing enclosing the gearing and driven shaft; a fixed brake member mounted on the casing; a cooperative brake member normally out of engagement with the fixed member and mounted to reciprocate and rotate; and means acting on the cooperative member controlled by centrifugal force to shift said member into engagement with the fixed member.

22. In combination with the driving and driven shafts of a vehicle, gearing between the two shafts; a casing enclosing the gearing and driven shaft; a fixed brake member mounted on the casing; a movable brake member between said gearing and the other member and normally out of engagement with said fixed member; and means controlled by centrifugal force for driving the movable member into engagement with the fixed member.

23. In combination with the driving and driven shafts of a vehicle, gearing between the two shafts; a casing enclosing the gearing and driven shaft; a brake member mounted on the casing; a movable brake member between said gearing and the other member; and toggle mechanism controlled by the speed of the driven shaft to actuate said movable member.

24. A brake mechanism for vehicles comprising two members one fixed and the other movable and arranged for cooperative engagement; means for normally separating the brake members arranged to impose thereon a predetermined regulatable pressure; and means under control of the speed of a driving member for forcing the brake members together.

25. A brake mechanism for vehicles comprising a pair of normally separated members arranged in cooperative relation; means for holding said brake members separated for a predetermined speed imposed upon a driving part, the said separating means being adapted also to produce a quick separation of the brake members when the speed of the driving part is reduced; and means including the driving part and controlled by the speed thereof for forcing the brake members into engagement in opposition to the force of the separating means.

26. A motor vehicle having means for driving the same at any or at indefinite speed; a normally unset brake mechanism for said vehicle mounted on a driven part thereof and to which part it is to be applied; and means for setting the brake when the speed of the vehicle attains a predetermined maximum to reduce the speed of the vehicle without stopping the same.

27. A motor vehicle having means for driving the same at any or at indefinite speed; a normally unset brake mechanism mounted on a driven part to which it is to be applied; and means for setting the brake mechanism in action under control of a part of the vehicle subjected to rotary motion to reduce the speed of the vehicle without stopping the latter.

28. A brake mechanism for vehicles comprising two members, one of which is fixed and the other of which is movable, the said two members being arranged in cooperative relation; and interacting means whereby the movable member will be driven into engagement with the fixed member when the vehicle has attained a predetermined speed to reduce said speed, and will disengage said fixed member when the speed of the vehicle has been reduced as predetermined.

29. A motor vehicle having means for driving the same; a brake mechanism comprising fixed and movable members cooperatively arranged; spring means normally controlling the movable member to hold it disengaged from the fixed member; and means for driving the movable member against the fixed member when the vehicle has attained a predetermined speed to reduce said speed without stopping the vehicle.

30. A motor vehicle having means for driving the same at any or at indefinite speed; a normally unset brake mechanism for said vehicle to be applied to a driven part thereof; and toggle mechanism operating directly upon a part of the brake mechanism for setting the brake when the speed of the vehicle attains a predetermined maximum, to reduce the speed of the vehicle without stopping the same.

31. A motor vehicle having means for driving the same at any or at indefinite speed; a normally unset brake mechanism mounted on a driven part to which it is to be applied; and toggle mechanism operating directly upon a part of the brake mechanism for setting the brake, when the speed of the vehicle attains a predetermined maximum, to reduce the speed of the vehicle without stopping the same.

GEORGE STOWE.
GEORGE E. MOLYNEUX.